Feb. 17, 1953 H. H. DUERR 2,628,901

PROCESS OF PREPARING TRICOLOR SEPARATIONS

Filed Dec. 30, 1950 2 SHEETS—SHEET 1

INVENTOR
HERMAN H. DUERR
BY [signatures]
ATTORNEYS

Feb. 17, 1953 H. H. DUERR 2,628,901

PROCESS OF PREPARING TRICOLOR SEPARATIONS

Filed Dec. 30, 1950 2 SHEETS—SHEET 2

INVENTOR
HERMAN H. DUERR
BY [signature]
ATTORNEYS

Patented Feb. 17, 1953

2,628,901

UNITED STATES PATENT OFFICE 2,628,901

PROCESS OF PREPARING TRICOLOR SEPARATIONS

Herman H. Duerr, Binghamton, N. Y., assignor to General Aniline & Film Corporation, New York, N. Y., a corporation of Delaware Application December 30, 1950, Serial No. 203,593

6 Claims. (Cl. 95—2)

Figure 1:
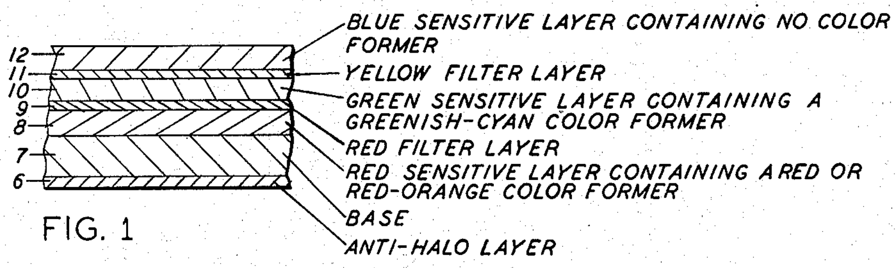
Figure 1A:
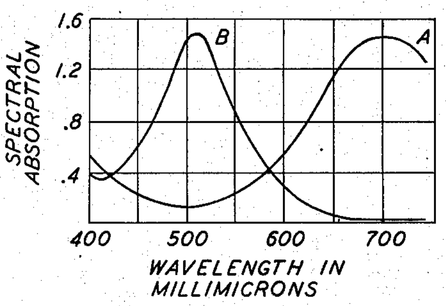

This invention relates to color photography and particularly to a process of preparing tricolor separations.

In many applications of color photography, especially in the production of professional motion pictures, it is highly desirable to obtain black and white tricolor separations from a multilayer color material used in the camera. These tricolor separations can be used for the preparation of optical effects, fades, wipes and other effects requiring one or more printing steps.

It is well known in the photographic art that with presently available dyes used in multilayer color films every printing step with negatives from such film leads to a certain amount of color degradation. This color degradation is due to undesirable absorptions of the dye images formed in certain layers of a multilayer color film. For instance, the magenta-colored image formed in the green sensitive layer of a multilayer color negative film not only absorbs in the green region of the spectrum, which would be desirable, but also has an undesirable absorption in the blue and in the red-orange region of the spectrum. Therefore, in printing from such a multilayer color film upon a multilayer printing material, the magenta image, which should print only in the green sensitive layer of the multilayer positive film, also produces an undesirable yellow density in the blue sensitive layer and an equally undesirable cyan density in the red sensitive layer of the multilayer printing material. These undesirable densities produce the degradation of the color image in the print.

If tricolor separations are to be made from the multilayer color original, a similar degradation occurs because the magenta image is printing an undesirable density in the blue separation and red separation record. To avoid these color degradations, methods of color correction or masking are usually resorted to.

Since all color printing operations, especially if not compensated for by masking, produce color degradation, and since additional accumulative degradation occurs with each subsequent color printing step, it is preferable for motion picture use to carry out these printing steps, especially for the production of special effects, on black and white color separations which should represent the best possible pure extract of the three primary colors of the original subject.

Another reason for the desirability of having black and white silver images of the color separations is their stability, making them particularly well suited for safekeeping and record purposes.

Tricolor separation negatives or positives from the original photographed scenes are currently obtained by the following methods:

(1) Tricolor separation cameras, in which, by use of beam-splitting devices and appropriate filters, the three color primaries, red, green, and blue, are recorded on three different film strips. This method of color separation is the best obtainable up to now and leads to a minimum of color degradation in the original color records. However, there are very serious disadvantages attendant upon this method of color recording. The type of camera used is extremely critical in adjustment, very cumbersome and expensive. The optical beam-splitting system, together with the necessary tricolor separation filters, introduces a very heavy light loss, which makes such a camera of very limited usefulness in motion picture production.

(2) In another method of obtaining tricolor separations, the light losses due to beam-splitting and filtration are minimized by splitting the incoming light in only two light beams and using a bipack film at one focal plane and a regular panchromatic film at a second focal plane position.

This type of camera, frequently used in motion picture productions, is still critical in adjustment and operation, but the light losses are minimized. However, due to the break in optical contact between the two film strips forming the front and rear element of the bipack, the loss of sharpness and definition in the rear element is unavoidable.

(3) A more recent method, using an integral tripack or monopack as a camera material, is gaining preference. Such a material can be used in a regular camera. This tripack or monopack usually consists of a red sensitive bottom layer and a green sensitive middle layer, separated by a yellow filter from the blue sensitive top layer. The colors in the individual layers are either produced through non-diffusing color couplers in the respective layers or are introduced by successive processing steps.

In the conventional integral tripack or monopack material, a cyan image is produced in the red sensitive bottom layer, a magenta image in the green sensitive middle layer, and a yellow image in the blue sensitive top layer. Integral tripacks, especially of the color negative type, can be made at higher speed and require less light exposure than the usual tricolor separation cameras.

Due to the close proximity of the layers, no break in optical contact takes place and, consequently, the image sharpness in such an integral tripack is superior to that obtainable in bipacks consisting of separate films.

The integral tripack, however, has the great disadvantage that the color records in the integral layers cannot be separated without undesirable color degradation due to the overlap of the absorptions of the colors in the layers. This is particularly true in the case of the blue record in the top layer, which is degraded by undesirable blue absorptions of the magenta dye in the green sensitive layer, and of the cyan dye in the red sensitive bottom layer. A similar overlap leading to considerable degradation in color is also to be found between the cyan and magenta layer.

To provide a process of preparing tricolor separations of the individual color record from an integral tripack material in which the individual layers are sensitive to different regions of the spectrum and are in contact with each other during exposure, constitutes the principal object of the present invention.

Another object is to provide a process which utilizes an auxiliary film in combination with an integral tripack whereby the preparation of tricolor separations is readily obtainable with a minimum or no degradation of color.

A still further object is to eliminate the serious disadvantages of an integral tripack by means of an auxiliary film and a new processing procedure.

Other objects and advantages will appear hereinafter.

The foregoing objects are accomplished by first providing an integral tripack in which the blue sensitive top layer is free of color former and in which the middle green sensitive and the bottom red sensitive layer each contains a color former capable of yielding, upon color forming development, a dye image which is adaptable for color separation by printing with colored light. An auxiliary film consisting of a film base coated with a clear gelatin layer containing an alkali sulfide, stannous chloride, colloidal silver, colloidal silver sulfide or colloidal gold sulfide and a compound capable of forming a silver salt of low solubility such as mercaptobenzothiazole, mercaptophenyltetrazole or mercaptobenzimidazole, and impregnated with a developer-fixer solution of high viscosity is then placed in close contact with the exposed tripack for approximately 1 to 2 minutes. The negative image in the top layer is developed but the residual silver halide is transferred to the auxiliary film in which a positive image representing the blue extract is deposited. The auxiliary film is stripped off and washed. The negative tripack is shortstopped and after thorough washing, developed in a conventional color developer. The color developed film is shortstopped, washed, bleached, fixed, washed, and dried in the customary manner. After processing, it contains in the bottom layer, a cyan image representing the red record, and in the middle layer, a yellow image representing the green record. The yellow filter layer as well as the emulsion top layer have been converted into clear gelatin layers. The green and red records are then separated by printing on panchromatic film by the use of sharp cutting filters, respectively.

For a clearer understanding of the invention and the accomplishment of the foregoing objects resort is made to the illustrations in the accompanying drawings in which Figures 1 to 4 represent self-explanatory enlarged sectional views of integral tripacks, in which the top blue sensitive layers do not contain the customary yellow color formers. Figures 1A to 4A inclusive represent the approximate or desired absorption curves of the developed color formers in the green and red sensitive layers of the tripack materials illustrated in Figures 1 to 4. Figure 5 represents an enlarged sectional view of the auxiliary film having a gelatin layer containing sodium sulfide or stannous chloride and the like coated on a film base.

Referring to the drawings and particularly to Figure 1, the multilayer film comprises the usual cellulose ester base 7, the bottom portion of which is coated with the customary anti-halation layer 6 which normally consists of any one of the usual anti-halation dyes dispersed in a colloidal carrier, such as gelatin, hydroxyethyl cellulose, polyvinyl alcohol, water soluble salts of a dicarboxylic acid, esters of cellulose, and the like. The red sensitive emulsion layer 8 contains any green color former, of the type usual in multilayer color film, which upon color coupling development, yields a greenish cyan dye having absorption characteristics similar or approximate to that shown by curve A of Figure 1A. The green sensitive layer 10 contains any red or red-orange color former, of the type usual in multilayer color film, which upon color coupling development yields a dye having similar or approximate absorption characteristics indicated by curve B of Figure 1A. Between the red sensitive emulsion layer 8 and the green sensitive emulsion layer 10, there is a gelatin red filter layer 9 containing a red filter dye which is readily decolorized or removed in the processing bath, such as, for example, 1-(4'-sulfophenyl)-3-methyl-4-(p-diethylaminobenzylidene)-5-pyrazolone, or 4-(2'-carboxyphenyl)azo-α-naphthol-2-carboxylic acid, and the like. Between the green sensitive layer 10 and the blue sensitive layer 12 there is a gelatin filter layer 11, containing colloidal silver as disclosed in USP 2,220,187, a filter dye such as described in USP 2,036,546, or a yellow azo dye which does not couple with the oxidation products of the color developer, such as Benzo Fast Yellow RL (By) C. I. #349A, and the like. The uppermost layer 12 which is blue sensitive does not contain the customary yellow color former. This applies to the uppermost layer 12 in the tripacks of Figures 2 to 4 inclusive.

Figure 2:
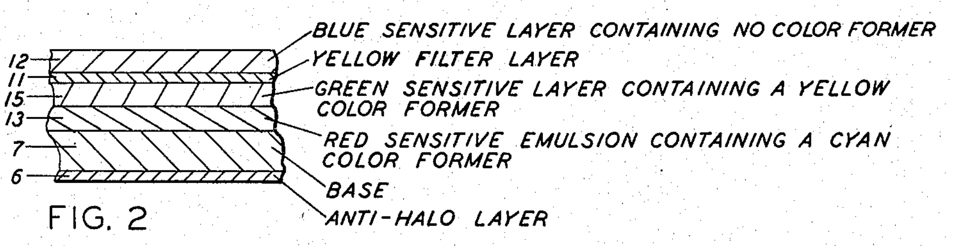
Figure 2A:
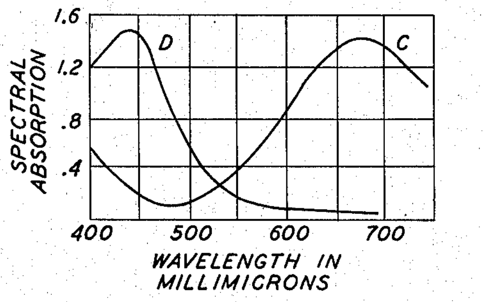
Figure 3:
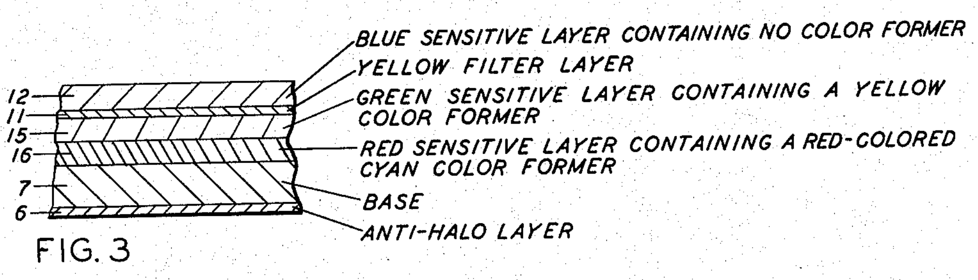
Figure 3A:
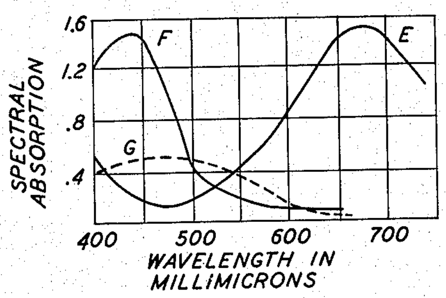
Figure 4:
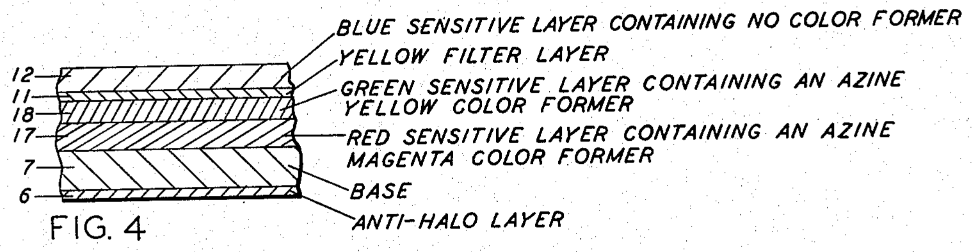
Figure 5:

The construction of the integral tripacks illustrated by Figures 2 to 4 inclusive is somewhat similar to the tripack of Figure 1, with the exception of the color formers in the green and red sensitive emulsion layers. The red sensitive layer 13, and the green sensitive layer 15 of Figure 2, contain cyan (blue-green) and yellow color formers, respectively, which upon color forming development yield dyes having approximate absorption characteristics shown by curves C and D, respectively, in Figure 2A. The red sensitive emulsion layer 16, and the green sensitive emulsion layer 15 of Figure 3, contain an orange-red azo-substituted cyan color former and a yellow color former, respectively, the dyes of which, after color coupling development have absorption characteristics similar to or approximate to those of curves E and F of Figure 3A. Curve G of this figure shows the approximate absorption characteristics which should be obtained by the uncoupled or residual orange-red azo-substituted color former in the red sensitive layer.

The orange-red colored azo-substituted cyan color former in the red sensitive emulsion layer 16 serves two purposes: (1) it acts as a filter dye in that layer to absorb undesirable green radiation penetrating that layer; and (2) after development, the residual red colored color former acts as a color correcting mask in the subsequent printing step to separate the color records from the individual layers. It is to be noted that instead of employing a red azo-substituted cyan color former in the red sensitive emulsion layer 16 of Figure 3, a mixture of a red azo dye and a cyan color former may be employed as described in USP 2,431,996.

It is very difficult in practice to find a red sensitizing dye for sensitizing the bottom red sensitive layer which has a sensitivity peak of about 640–660 millimicrons and at the same time produces little or no sensitivity in the green region, about 525–565 millimicrons. By using a colored color former absorbing in the green region, better separation of the sensitivities in the individual layers is obtained. This is important for an integral tripack material especially suited for tricolor separations because, while undesirable absorptions in the layers can be minimized by color correction or masking procedures, it is not possible to correct for spill-over sensitivity in the red sensitive layer, for instance, in subsequent masking or printing steps. For this reason, it is highly desirable to employ in the red sensitive layer any red azo substituted cyan color former of which the residual color and the developed dye have absorption characteristics similar or approximate to those shown by curves G and E, respectively, of Figure 3A.

Figure 4A:
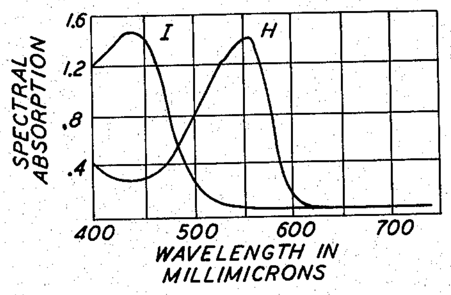

The red sensitive emulsion layer 17 and the green sensitive emulsion layer 18 in Figure 4 contain an azine-magenta color former and an azine-yellow color former, respectively, which upon color forming development yield dyes having approximate absorption characteristics shown by curves H and I, respectively, in Figure 4A.

The color formers which may be employed in the red and green sensitive layers illustrated by Figures 1 to 4 are many and no difficulty will be encountered in selecting those which upon color coupling development will have or display the same or approximate absorption characteristics shown by the curves in Figures 1A to 4A inclusive.

As examples of magenta, orange-red, cyan (blue-green), green, yellow, red azo-substituted cyan, azine-cyan, azine-magenta, and azine-yellow color formers, the following are illustrative:

*Colorless color formers for the formation of the magenta image*

1-(3′-carboxyphenyl)-3-heptadecyl-5-pyrazolone
1-(4′-sulfophenyl)-3-heptadecyl-5-pyrazolone
1-(3′-carboxyphenyl)-3-undecyl-5-pyrazolone
1-(2′-methoxy-4′-sulfophenyl)-3-heptadecyl-5-pyrazolone
1-(2′-methoxy-5′-sulfophenyl)-3-(3′-stearyl aminophenyl)-5-pyrazoline.

*Colorless color formers for the formation of red and red-orange images* p-Cyanoacetooctadecenyl succinanilide
p-Cyanoacetooctadecenyl succin-m-toluidide
p-Cyanoacetooctadecenyl succin-o-toluidide

*Colorless color formers for the cyan (blue-green) image*

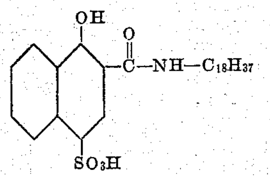

1-hydroxy-N-octadecylnaphthamide-4-sulfonic acid

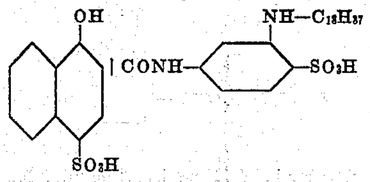

1-hydroxy-N-(3′-octadecylamino-4′-sulfophenyl)-2-naphthamide-4-sulfonic acid

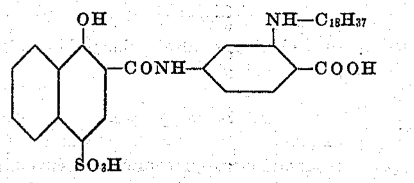

1-hydroxy-N-(3′-octadecylamino-4′-carboxyphenyl)-2-naphthamide-4-sulfonic acid

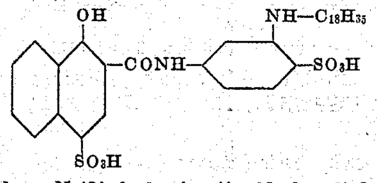

1-hydroxy-N-(3′-oleylamino-4′-sulfophenyl)-2-naphthamide-4-sulfonic acid

Additional examples of suitable cyan color formers, which may be utilized in accordance with the present invention, are disclosed in USP 2,156,821; 2,179,239; 2,357,394–5; and 2,500,487.

*Colorless color formers for the green image*

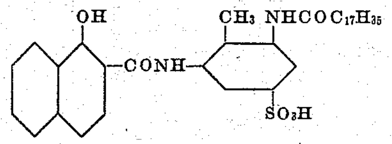

1-hydroxy-N-(3′-stearoylamido-2′-methyl-5′-sulfophenyl)-2-naphthamide

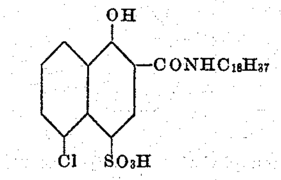

1-hydroxy-4-sulfo-5-chloro-N-octadecyl-2-naphthamide

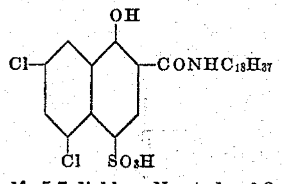

1-hydroxy-4-sulfo-5,7-dichloro-N-octadecyl-2-naphthamide

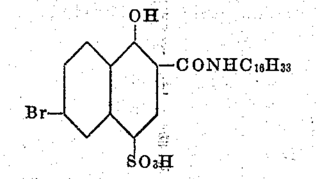

1-hydroxy-4-sulfo-6-bromo-N-hexadecyl-2-naphthamide

*Colorless color formers for the yellow image*

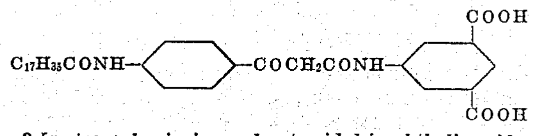

3-[p-stearoylaminobenzoylacetamido]-isophthalic acid

4[α-sulfostearoylaminobenzoyl]-acetanilide

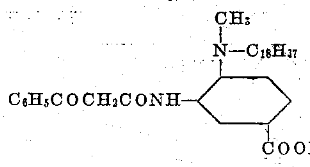

3-benzoylacetamino-4-[N-methyl-N-octadecylamino]-benzoic acid

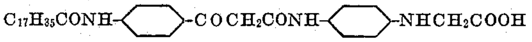

4-[p-stearoylaminobenzoylacetamido]-phenylglycine

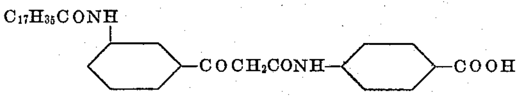

4-[m-stearoylamidobenzoylacetamino]-benzoic acid

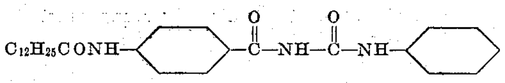

p-Lauroylaminobenzoylacetanilide

Other suitable yellow color formers are disclosed in USP 2,154,918; 2,186,735; 2,214,483; and 2,376,679.

*Red azo-substituted color forming dyes for the cyan (green) images*

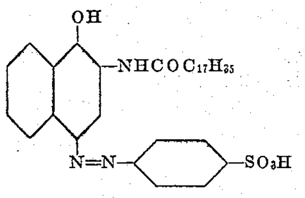

4-[4′-sulfophenylazo]-2-stearoylamiuo-α-naphthol

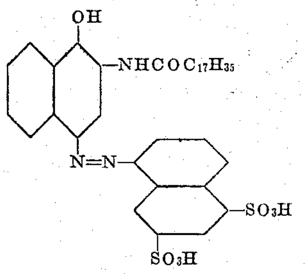

4-[5′,7′-disulfonaphthalene-1-azo]-2-stearoylamino-α-naphthol

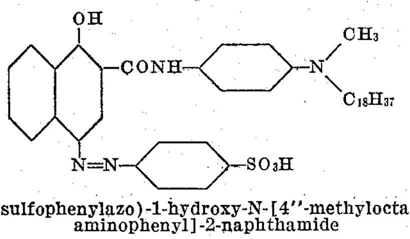

4-(4′-sulfophenylazo)-1-hydroxy-N-[4″-methyloctadecylaminophenyl]-2-naphthamide

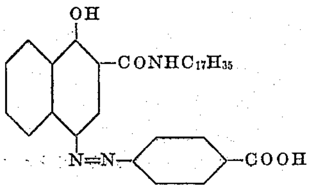

4-[4′-carbophenylazo]-1-hydroxy-N-heptadecyl-2-naphthamide

*Color formers for the azine-cyan image*

2-hexadecyl urethane of phenyl J acid
8-pentadecyl urethane of p-chlorophenyl J acid
Dodecyl urethane of β-sulfoethyl J acid
Dodecyl urethane of benzyl J acid
Octadecyl urethane of methoxymethyl J acid Additional azine-cyan and magenta color formers, which upon development with aromatic triamines, yield dyes having the desirable spectral curve may be found in USP 2,414,491 and 2,486,440. Illustrative aromatic triamino developers for such azine dyes are also found in these patents.

*Color formers for the azine-magenta image*

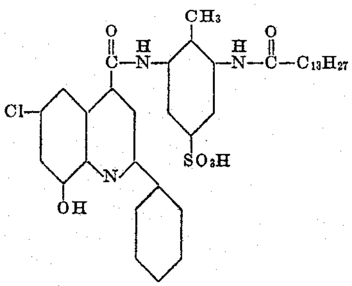

2-(6′-chloro-8′-hydroxy-2′-phenyl-cinchoninoylamino)-6-myristoylamino-toluene-4-sulfonic acid 3-stearoylamino-5-sulfoacetoacetanilide
8′ - hydroxyquinanilide - 2 - methyl - 3-stearoylamido-5-sulfonic acid
Octadecyl-1-hydroxy-2-naphthoylamide
Sodium salt of 4″ - stearylaminobenzoyl - 3′ - aminobenzenesulfonyl - 1 - amino - 8-hydroxynaphthalene-3,6-disulfonic acid.

*Color formers for the azine-yellow image*

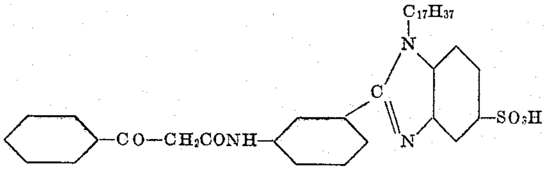

2-(m-benzoylacetamidophenyl)-1-octadecyl-5-benzimidazolesulfonic acid

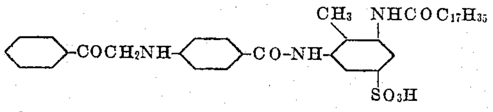

2-p-benzoylacetamidobenzamido-6-stearoylamino-p-toluenesulfonic acid

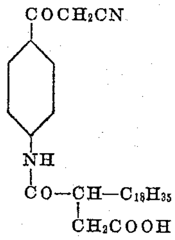

p-Cyanoacetyl-β-octadecenylsuccinalic acid

2 - (p - benzoylacetamidophenyl) - 1 - octadecyl - 5 - benzimidazolesulfonic acid.

The auxiliary film shown by Figure 5, which is temporarily laminated to the exposed integral tripack of Figures 1 to 4, consists of the usual film base 7, over which is coated a colloidal layer such as gelatin, a gelatin substitute, many of which are known to those skilled in the art, polyvinyl alcohol and the like containing colloidal silver, colloidal silver sulfide or colloidal gold sulfide or an alkali sulfide, such as sodium, potassium or lithium sulfide or stannous chloride in a concentration of 5 to 75 mgs. per 100 square centimeters of film. The sulfides or the stannous chlorides reduce a small amount of the diffusing silver salt dissolved in the developer-fixer solution to form minute nuclei of silver sulfide or silver. The addition of a compound capable of forming insoluble silver salts, for example, mercaptobenzothiazole, mercaptobenzimidazole or mercaptophenyltetrazole leads to images which are characterized by a black tone.

In squeegeeing the auxiliary film to the blue sensitive top layer of the exposed tripack, a developing solution containing hydroquinone, sodium sulfite, sodium thiosulfate, and a colloidal carrier to increase the viscosity thereof, such as methylcellulose or carboxy methylcellulose, is added to said solution to slow down the diffusion of the developer-fixer combination. The concentration of the colloidal carrier is immaterial. Any amount which will increase the viscosity of the developer-fixer solution so as to give it body and permit its coating without overflowing is sufficient. For practical purposes, the amounts may range from 1 to 50 grams per liter of developer-fixer solution. During the period of intimate contact with the exposed blue sensitive top layer 12, the blue image record is developed and the residual silver halide, which is dissolved diffuses to the gelatin layer 19 of the auxiliary film where the silver complex salt is reduced to metallic silver in the presence of colloidal silver, colloidal silver sulfide or colloidal gold sulfide nuclei. A positive image of the blue record is formed in the gelatin layer 19 of the auxiliary film which is stripped off. The blue record on the auxiliary film may be intensified if desired by using a Monkhoven Mercury intensifier or a regular copper or uranium intensifier.

The tripack material is then subjected to an acid shortstop bath to preclude the continued action of the developer-fixer solution followed by a water wash. The film is then color developed either in the usual color developer containing a primary aromatic amino developing agent or in the case of an integral tripack material containing azine color formers, as shown by Figure 4, in an azine developer as described in USP 2,486,440. During this processing, color negative images are produced in the middle green and bottom red emulsion layers but no color image in the top layer 12. The film is then subjected to the usual silver bleach bath containing ferricyanide and preferably an alkali halide, such as potassium bromide. The bleach converts all the silver into silver ferrocyanide or silver halide which is fixed out in a subsequent step leaving a film which now contains a colored image in the bottom red layer representing the red record and another color image in the middle green layer representing the green record, with a minimum of absorption overlap. The blue sensitive top layer now consists of a clear gelatin layer.

Separation positives of the green and red records with a minimum of color degradation are obtained by printing these dye images onto two separate panchromatic films utilizing sharp cutting filters. The transmission maxima of the filters used should preferably correspond to the absorption maxima of the image dyes.

By means of the azo-substituted color formers in the red sensitive layer, the separation is further facilitated by the masking effect obtained with such color formers. The masked density in this instance is not critical. To effect complete separation of the green and red record, the integral tripack at this stage can also be treated with aromatic diazonium salt solutions to form colored masks with a residual colorless color former in one of the layers by following the procedure described in application Serial No. 105,267, filed July 16, 1949, and entitled "Masking Process for Multilayer Color Film." The procedure described in said application is particularly applicable if a combination yellow color former in the green sensitive layer and a green color former in the red sensitive layer is used since the yellow color former does not easily couple with the diazonium salt.

The invention is further illustrated by the following examples although it is to be clearly understood that the invention is not restricted thereto.

*Example I*

A photographic integral tripack material constructed as shown in Figure 2 and containing in the green sensitive emulsion a yellow color former, 3-(p-stearoylaminobenzoylacetamido)-isophthalic acid, and in the red sensitive emulsion a cyan (blue-green) color former, 1-hydroxy-2-naphthoyl-4′-laurylamino-7′-sulfonaphthalide, was exposed and brought in contact with the auxiliary film which was coated with a monobath type developer-fixer solution of high viscosity of the following formula:

| | Grams |
|---|---|
| p-Methylaminophenol sulfate | 2.0 |
| Hydroquinone | 25.0 |
| Sodium sulfite (anhydrous) | 40.0 |
| Sodium hydroxide | 37.0 |
| Sodium thiosulfate | 7.0 |
| Potassium bromide | 0.5 |
| Sodium carboxymethyl cellulose | 20.0 |
| Water to make 1 liter. | |

Good contact between the tripack and the auxiliary film was insured during the development and image transfer step by means of a set of pressure rollers, followed by a drum. About 1 minute was required to develop the negative image in the top layer of the integral tripack and to transfer the residual silver halide of that layer onto the auxiliary film where a positive image representing the blue extract was deposited. After 45 seconds to about 1 minute, the auxiliary film, which represents the blue record of the exposed integral tripack was stripped off and washed.

The negative integral tripack was then shortstopped in a weak acetic acid solution and after a thorough washing with water, developed with a color developer of the following formula:

| | Grams |
|---|---|
| Sodium sulfite (anhydrous) | 3.0 |
| 4-diethylaminoaniline hydrochloride | 7.0 |
| Sodium carbonate (anhydrous) | 75.0 |
| Hydroxylamine hydrochloride | 1.0 |
| Potassium bromide | 2.0 |
| Water to make 1 liter. | |

The color developed film was shortstopped in a weak acetic acid solution, washed with water, and bleached in a ferricyanide bleach bath of the following composition:

| | | |
|---|---|---|
| Dipotassium monosodium ferricyanide | grams | 150.0 |
| Potassium bromide | do | 20.0 |
| Disodium phosphate ($2H_2O$) | do | 40.0 |
| Sodium bisulfate | do | 30.0 |
| Formaline 40% aqueous solution | cc | 20.0 |
| Water to make 1 liter. | | |

The bleached film was fixed with a 20% aqueous solution of sodium thiosulfate, washed with water, and dried. The integral tripack now has a cyan image representing the red record in the bottom layer and a yellow image representing the green record in the middle layer. The yellow filter layer, as well as the emulsion top layer, were converted into clear gelatin layers.

To separate the green record, the original was printed on a blue sensitive film using a sharp cutting blue filter, such as, for example, Wratten 49-B, while the red record was printed on a panchromatic film utilizing a red filter, such as, for example, Wratten #29.

The red, green and blue separation negatives obtained as above are equal in quality to those obtained with a tricolor separation camera and are utilized in any type of subtractive printing.

*Example II*

An integral tripack constructed according to Figure 3 in which the red sensitive emulsion 16 contains 4-(4'-sulfophenylazo)-2-stearoylamino-α-naphthol as a red azo-substituted color former yielding a cyan dye upon color development and the green sensitive emulsion 15 contains 3-(p-stearoylaminobenzoylacetamido)-isophthalic acid as a yellow color former was exposed, coated with the developer-fixer solution, brought in contact with the auxiliary film, and processed as in the preceding example.

The red azo-substituted color former acts as a filter and precludes any spill-over green light from being recorded in the red sensitive bottom layer and at the same time produces a mask correcting the undesirable absorption of the cyan dye in the blue and green region.

*Example III*

An integral tripack constructed according to Figure 2 in which the green sensitive emulsion 15 contains 3-benzoylacetamino-4-(N-methyl-N-octadecylamino)benzoic acid as a yellow color former and the red sensitive emulsion 13 contains 1-hydroxy-N-(3'-stearoylamido-2'-methyl-5'-sulfophenyl)-2-naphthamide as a green color former, was exposed, coated with the developer-fixer solution, brought in contact with the auxiliary film, and processed as in Example I up to and including the bleaching, fixing, and water washing steps.

The bleached, fixed, and washed film was treated from 2 to 5 minutes at 20° C. in a masking solution prepared as follows:

1.91 parts of sulfanilic acid (monohydrate) were dissolved in 500 parts of warm water. The solution was cooled quickly to 5° C., acidified with 1.5 parts of concentrated hydrochloric acid and diazotized with 0.7 part of sodium nitrite in 25 parts of water. The pH of the diazonium salt solution was adjusted to approximately 5 by the addition of 0.4 part of sodium acetate (trihydrate).

The processed film was washed in water for 15 minutes and now contains a magenta azomethine dye image in the green sensitive layer in combination with a positive yellow azo dye masking image and a cyan quinonimine dye image in the red sensitive layer in combination with a red azo dye masking image.

It is evident from the foregoing examples that the procedure employed in the preparation of tricolor separation negatives is simple and requires a shorter period of time. By merely choosing from a wide variety of integral tripacks, in which the top blue sensitive layer does not contain a color former, it is possible to preserve the simplicity of using a single film in a regular motion picture camera and to obtain color separations equal in quality to those obtained with a tricolor separation camera.

While I have disclosed the preferred embodiments of my invention and the preferred modes of carrying the same into effect, it will be readily apparent to those skilled in the art that many variations may be made therein without departing from the spirit thereof. For example, the developer-fixer solution may consist of any one of the silver halide developing solutions normally used in black and white development to which has been added a fixing agent, such as ammonium or sodium thiosulfate and a sufficient quantity of a water or alkali dispersible colloidal carrier, such as polyvinyl alcohol, hydroxyethylcellulose, methylcellulose, carboxy methylcelluose, and the like, so as to increase the viscosity of the developer-fixer solution and preclude its diffusion into the green and red sensitive layers of the integral tripack. Accordingly, the scope of my invention is to be limited solely by the appended claims.

I claim:

1. In the process of preparing tricolor separations from an exposed multilayer color film comprising a support bearing superimposed silver halide emulsion layers and being sensitized respectively to the blue, green, and red regions of the spectrum, the blue sensitive layer being outermost and being devoid of color former, and the green and red sensitive layers each containing a color former fast to diffusion and capable of reacting with the oxidation products of an aromatic primary amino developing agent to yield a dyestuff image, the improvement which comprises contacting the outermost layer of said film with an auxiliary film comprising an impermeable support bearing a colloidal layer containing a member selected from the group consisting of an alkali sulfide, stannous chloride, colloidal silver, colloidal silver sulfide and colloidal gold sufide, while forcing the colloidal layer of said auxiliary film firmly against the surface of the blue sensitive layer of the multilayer film in the presence of a developer-fixer solution for a sufficient length of time to cause the developer-fixer solution to develop the negative image in said blue sensitive layer, to dissolve the residual silver halide of said layer and transfer it to the colloidal layer of the auxiliary film and effect reduction of said residual silver halide in said colloidal layer, stripping off and washing the auxiliary film containing the blue record, processing the multilayer film by color forming development with said aromatic primary amino developing agent, bleaching and fixing it to a negative containing the red and green records respectively, and printing said records on to separate sensitized film with sharp cutting filters.

2. In the process of preparing tricolor separations from an exposed multilayer color film comprising a support bearing superimposed silver halide emulsion layers and being sensitized respectively to the blue, green, and red regions of the spectrum, the blue sensitive layer being outermost and being devoid of color former, and the green and red sensitive layers each containing a color former fast to diffusion and capable of reacting with the oxidation products of an aromatic primary amino developing agent to yield a dyestuff image adaptable for color separation by printing with colored light, the improvement which comprises contacting the outermost layer of said film with an auxiliary film comprising an impermeable support bearing a colloidal layer containing a member selected from the group consisting of an alkali sulfide, stannous chloride, colloidal silver, colloidal silver sulfide and colloidal gold sulfide, while forcing the colloidal layer of said auxiliary film firmly against the surface of the blue sensitive layer of the multilayer film in the presence of a developer-fixer solution for a sufficient length of time to cause the developer-fixer solution to develop the negative image in said blue sensitive layer, to dissolve the residual silver halide of said layer and transfer it to the colloidal layer of the auxiliary film and effect reduction of said residual silver halide in said colloidal layer, stripping off and washing the auxiliary film containing the blue record, processing the multilayer film by color forming development with said aromatic primary amino developing agent, bleaching and fixing it to a negative containing the red and green records respectively, and printing said records on to separate sensitized film with sharp cutting filters.

3. In the process of preparing tricolor separations from an exposed multilayer color film comprising a support bearing superimposed silver halide emulsion layers and being sensitized respectively to the blue, green, and red regions of the spectrum, the blue sensitive layer being outermost and being devoid of color former, and the green and red sensitive layers each containing a color former fast to diffusion and capable of reacting with the oxidation products of an aromatic primary amino developing agent to yield a dyestuff image, the colors of said dyestuff image being essentially complementary to each other, the improvement which comprises coating the outermost layer of said film with a developer-fixer solution, intimately contacting the said coated surface with an auxiliary film comprising an impermeable support bearing a colloidal layer containing a member selected from the group consisting of alkali sulfide, stannous chloride, colloidal silver, colloidal silver sulfide, and colloidal gold sulfide, for a time sufficient to develop the blue image record in the exposed film and cause the diffusion of the residual silver halide of the blue sensitive layer to the gelatin layer of the auxiliary film and reducing said residual silver halide in said auxiliary film, stripping off and washing the auxiliary film which contains the blue record, processing the exposed multilayer color film by color forming development with said aromatic primary amino developing agent, bleaching, fixing and washing, and printing the green and the red records of the processed film on sensitized film with sharp cutting filters.

4. In the process of preparing tricolor separations from an exposed multilayer color film comprising a support bearing superimposed silver halide emulsion layers and being sensitized respectively to the blue, green, and red regions of the spectrum, the blue sensitive layer being outermost and being devoid of color former and the green and red sensitive layers each containing a color former fast to diffusion and capable of reacting with the oxidation products of an aromatic primary amino devoloping agent to yield a dyestuff image complementary in color to the region for which the layer is sensitized, the improvement which comprises impregnating the colloidal layer of an auxiliary film comprising an impermeable support bearing a colloidal layer containing a member selected from the group consisting of alkali sulfide and stannous chloride with a developer-fixer solution and intimately contacting the impregnated surface of the auxiliary film with the outermost layer of said multilayer color film for a time sufficient to develop the blue image record in the exposed film and cause the diffusion of the residual silver halide of the blue sensitive layer to the gelatin layer of the auxiliary film and reducing said residual silver halide in said auxiliary film, stripping off and washing the auxiliary film which contains the blue record, processing the exposed multilayer color film by color forming development with said aromatic primary amino developing agent, bleaching, fixing, and washing, and printing the green and the red records of the processed film on sensitized film with sharp cutting filters.

5. In the process of preparing tricolor separations from an exposed multilayer color film comprising a support bearing superimposed silver halide emulsion layers and being sensitized respectively to the blue, green, and red regions of the spectrum, the blue sensitive layer being outermost and being devoid of color former and the green and red sensitive layers each containing a color former fast to diffusion and capable of reacting with the oxidation products of an aromatic primary amino developing agent to yield a dyestuff image complementary in color to the region for which the layer is sensitized, the improvement which comprises impregnating the colloidal layer of an auxiliary film comprising an impermeable support bearing a colloidal layer containing colloidal silver and mercaptobenzothiazole with a developer-fixer solution and intimately contacting the impregnated surface of the auxiliary film with the outermost layer of said multilayer color film for a time sufficient to develop the blue image record in the exposed film and cause the diffusion of the residual silver halide of the blue sensitive layer to the gelatin layer of the auxiliary film and reducing said residual silver halide in said auxiliary film, stripping off and washing the auxiliary film which contains the blue record, processing the exposed multilayer color film by color forming development with said aromatic primary amino developing agent, bleaching, fixing, and washing, and printing the green and the red records of the processed film on sensitized film with sharp cutting filters.

6. The process as defined in claim 1, wherein the colloidal layer of the auxiliary film also contains a compound capable of forming a silver salt of low solubility, said compound being selected from the class consisting of mercaptobenzothiazole, mercaptophenyltetrazole, and mercaptobenzimidazole.

HERMAN H. DUERR.

REFERENCES CITED

The following references are of record in the file of this patent:

UNITED STATES PATENTS

| Number | Name | Date |
|---|---|---|
| 2,168,183 | Wilmanns et al. | Aug. 1, 1939 |
| 2,352,014 | Rott | June 20, 1944 |

FOREIGN PATENTS

| Number | Country | Date |
|---|---|---|
| 485,862 | Great Britain | May 25, 1938 |
| 900,266 | France | Sept. 25, 1944 |